Aug. 26, 1958 B. MARTIN 2,849,546
COMPRESSOR CIRCUIT
Filed March 8, 1956
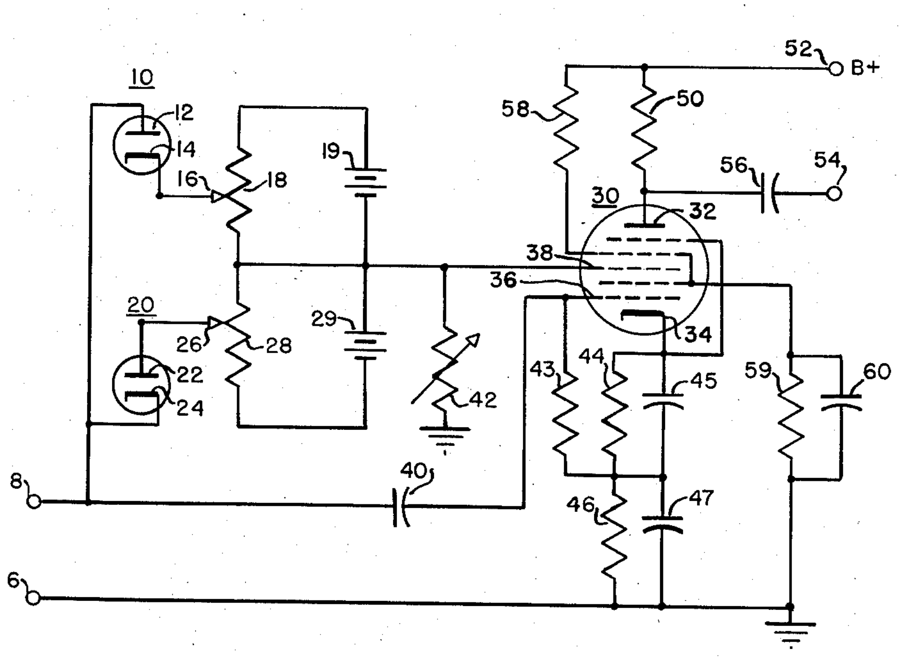
INVENTOR,
BERNARD MARTIN.
BY
Harry M. Saragovitz
ATTORNEY 2,849,546
Patented Aug. 26, 1958

2,849,546

COMPRESSOR CIRCUIT

Bernard Martin, Long Branch, N. J.

Application March 8, 1956, Serial No. 570,394
2 Claims. (Cl. 179—171)
(Granted under Title 35, U. S. Code (1952), sec. 266)

The invention described herein may be manufactured and used by or for the Government for governmental purposes, without the payment of any royalty thereon.

This invention relates to compressor circuits and more particularly to circuits for compressing audio signals. More particularly this invention relates to a circuit to be used in conjunction with an audio amplifier to compress peak signals. More particularly this invention relates to a circuit for compressing the peak amplitudes of alternating signal voltages.

There are many compressor circuits that have been developed to fill the need for reducing the overall gain or reducing the peak voltages of signals when those signals approach the maximum signal handling capacity of a given amplifier, or when those signals would provide an excessive or even dangerous signal level to a secondary piece of equipment or a loud speaker. The basic concept of these circuits is that seen in automatic volume control techniques in conventional radios wherein the mean level of the signal is detected, filtered and fed back as a bias voltage to the control grid of one of the vacuum tube amplifiers of the receiver. This concept applies equally well to radio frequency signals or audio frequency signals.

The gain of the vacuum tube is controlled to some extent by its grid bias, which thereby controls the gain of the amplifier. The rate of change of plate current of the vacuum tube corresponding to a rate of change of the grid voltage varies considerably with grid bias level in certain vacuum tubes, particularly those of a remote cut-off variety. Consequently if the mean bias on the control grid is varied the gain of the tube will change corresponding to the operating point of the dynamic characteristics of the tube.

A similar technique is commonly used in compressor circuits where the detected and filtered voltage is fed back to the suppressor grid or any other grid of a multi-electrode tube. Each of the grids affects the gain of the tube to some extent and the circuit gain may be controlled in this way without changing the mean bias of the control grid.

In almost all of these circuits a sudden change in signal voltage can be almost immediately detected and fed back to the control tube but the integrating circuit requires a substantial time constant and the gain of the tube cannot be as quickly restored; in other words a peak signal may be suppressed but a weak signal immediately following may not find enough gain to amplify it to useable level.

Many circuits have been developed particularly for telephone communication where the peaks have been effectively clipped off by diode action so that the full gain of the amplifier is retained for the weaker signals. This inevitably causes a severe harmonic distortion to make the signals much less intelligible.

In this invention the input signal is applied to a control grid and at the same time to a system of diodes normally biased to cutoff. This system of diodes is ultimately connected to a secondary grid of a multielement vacuum tube to change its average gain in response to peak biasing signals.

This invention normally utilizes the optimum bias of the secondary grid from a gain standpoint, so that, the gain of the tube is decreased when the bias of the secondary grid is either raised or lowered. The more symmetrical the decrease that can be achieved for both raising and lowering the bias, the more uniform will be the compression of both the positive and the negative peaks.

It is therefore an object of this invention to provide a compressor circuit.

It is a further object of this invention to provide a compressor circuit for use with audio amplifiers.

It is a further object of this invention to provide a compressor circuit that responds only to peak signals.

It is a further object of this invention to provide a compressor amplifier that functions instantaneously and whose compressing action is cut off as fast as it is cut on.

It is a further object of this invention to provide a compressor that functions equally well on both positive and negative peaks.

Other and further objects of this invention will become apparent from the following specification and the drawing which shows a typical compressor circuit connected according to the teachings of this invention.

Referring now more particularly to the drawing the circuit is shown having input terminals 6 and 8; 6 being grounded and 8 being directly coupled to the plate 12 of diode 10 and the cathode 24 of diode 20. Terminal 8 also connects to one side of condenser 40. The cathode 14 of diode 10 connects to the variable tap 16 of potentiometer 18. The plate 22 of diode 20 connects to the variable tap 26 of the potentiometer 28. Battery 19 is connected across potentiometer 18 and battery 29 is connected across potentiometer 28. The negative terminal of battery 19 is connected to the positive terminal of battery 29 and to one side of variable resistor 42 and to a secondary electrode 38 of vacuum tube 30. The other side of the variable resistor 42 is connected to ground. The condenser 40 is also connected through the grid resistor 43 to the midpoint of voltage dividing resistors 44 and 46 which are connected in series between cathode 34 and ground. Cathode by-pass condensers 45 and 47 are connected across cathode resistors 44 and 46 respectively. The plate load 50 connects from the source of potential 52 to the anode 32 of the compressor tube 30. The anode is also connected to the output 54 through decoupling condenser 56. Resistors 58 and 59 supply potential to the screen grids of the vacuum tube and condenser 60 forms the screen by-pass condenser.

In operation the diodes 10 and 20 are biased beyond their respective cutoff points by voltage dividers 18 and 28. The battery 19 provides a positive potential to the cathode 14 of tube 10 and battery 29 provides a negative potential to the plate of diode 20. The amount of positive and negative potential respectively can be controlled by the positions of the corresponding potentiometer taps 16 and 26. When no signal is applied at the input 8 neither of the diodes canducts and the compressor grid 38 of tube 30 is held at ground potential through the resistor 42. The voltage dividing terminal 16 and 26 will normally be set so that normal signals will not drive either diode into an operating range.

All of the signals from input 8 are applied through condenser 40 to the grid 36 of the compressor tube 30. The variation of potential on control grid 36 varies the flow of current through the tube and through the load resistor 50 in the normal way so that a corresponding amplified voltage appears at the plate 32 to be applied through condenser 56 to an output 54. The normal current of the tube flowing through resistor 44 supplies the correct operating bias for the control grid 36 of the tube and the current through resistors 44 and 46 in series raise the cathode to the desired potential with respect to the compressor grid 38 for its effective operation. Resistor 44 is by-passed by condenser 45 to reduce cathode degeneration and resistance 46 is by-passed by condenser 47 for the same purpose. The voltage dropping resistor 58 provides the corrected operating potential to the screen grids of this tube while condenser 60 by-passes the screens.

When the peaks of the input signals at 8 are higher than the bias voltages set on the diodes, the diodes begin to conduct; for example, a positive peak on the plate 12 higher than the voltage of the cathode 14 as set by the contact 16 of the potentiometer 18 will cause a current to flow from the input 8 through diode 10, potentiometer 18, and variable resistor 42, to ground. The voltage drop across resistor 42 applies a positive voltage to the compressor grid 38. This change in the bias of grid 38 decreases the gain of the tube 30 and reduces the peak to which the plate 32 would otherwise have been driven by the input voltage on the control grid 36.

The opposite effect occurs when the negative peak applied to the cathode 24 of diode 20 becomes greater than the bias of its plate 22 as set by the terminal 26 of voltage divider 28. The current this time is in the opposite direction and the voltage drop across resistor 42 now applies a negative potential to compressor grid 38 of compressor tube 30.

Even though the shift in bias of the compressor grid is in the opposite sense it has the same effect of altering the optimum parameters of the tube and again decreasing its gain. This follows logically since the maximum gain of the tube is achieved by the optimum settings of all of its control elements. Any change in any direction away from the optimum settings must decrease the gain of the tube. Therefore, the plate 32 is again prevented from reaching the peak—this time in a positive sense—that it would otherwise have reached in response to the negative signal on the control grid 36.

The resistor 42 is made variable to control the effective deviation in conversion transconductance of the tube as a function of the applied signal voltage.

The settings of 16 and 26 would presumably be adjusted so that both diodes begin to conduct at the same absolute value of signal level. If identical biasing batteries 19 and 29 are used and the potentiometers 18 and 28 have the same characteristics the controls 16 and 26 may be ganged together from this point on to change the bias of both diodes by the same amount simultaneously.

The bias voltages on the diodes change the voltage level at which the signal voltage begins to actuate the compressor tube. The variation of the resistor 42 controls the change in the tube conductance for a given current through the diodes. In this way the diodes may be made to react sooner to the signal voltage peaks with less ultimate effect on the gain of the tube or the diodes may be made to be actuated only by the higher signal peaks with a sharper control of the gain at the tube.

The vacuum tube diodes 10 and 20 may of course be replaced by germanium diodes.

In the typical examples shown here the diodes 10 and 20 are halves of a 6H6 duo-diode vacuum tube and the tube 30 is a 6L7. The batteries 19 and 29 could each have a potential of 3 volts to be within the working range of the control grid of the 6L7 and the potential dividers 18 and 28 could have values of 10,000 ohms. The resistor 42 might have a maximum value of 100,000 ohms and is of course variable. Grid resistor 42 could be of the order of 330,000 ohms, and cathode resistors 44 and 46 should be 270 ohms and 520 ohms respectively. The plate resistor 50 should be 22,000 ohms and the screen resistor 58 should be 33,000 ohms for the correct bias of the 6L7. The resistor 59 can be about 330,000 ohms; the condensers 40 and 56 can be .05 microfarad; and the decoupling condensers 45, 47 and 60 can be about 10 microfarads for proper control of audio frequencies. The source of potential 52 could be in the order of 250 volts. The screen voltage of this tube should be about 100 volts with a cathode potential of 9½ volts and a first control grid potential of 6½ volts to provide the correct operating bias for second control grid 38.

While there has been described what is at present considered to be the preferred embodiment of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A compressor circuit comprising a vacuum tube having a plate electrode, a cathode electrode, a first control electrode, and a second control electrode; a source of positive potential with respect to ground; a load impedance connected in series with said vacuum tube across said source of potential; a source of alternating signal voltage adapted to be connected to said first control electrode; a first diode having an anode and a cathode, a first potentiometer having a variable tap; a first source of voltage connected across said potentiometer, the anode of said first diode connected to said source of signal voltage; the cathode of said first diode connected to the variable tap of said potentiometer; the negative terminal of said first source of voltage connected to said second control electrode, a second diode having an anode and a cathode, a second potentiometer havinging a variable tap, a second source of voltage connected across said second potentiometer; the anode of said second diode connected to the variable tap of said second potential divider, the cathode of said second diode connected to said source of signal voltage, the positive terminal of said second source of voltage connected to said second control electrode and a variable resistance connected between said second control electrode and ground.

2. In a compressor circuit as in claim 1 means for moving said variable tap of said first potentiometer towards said negative terminal of said first source of potential and moving said variable tap of said second potentiometer towards the positive terminal of said second source of potential simultaneously.

References Cited in the file of this patent

UNITED STATES PATENTS

| | | |
|---|---|---|
| 2,272,788 | Bishop | Feb. 10, 1942 |
| 2,285,044 | Morris | June 2, 1942 |
| 2,497,693 | Shea | Feb. 14, 1950 |
| 2,533,253 | Howard | Dec. 12, 1950 |
| 2,580,052 | Torre et al. | Dec. 25, 1951 |
| 2,615,999 | Culcietto | Oct. 28, 1952 |